No. 781,158. PATENTED JAN. 31, 1905.
O. W. RANDALL.
VEHICLE SHAFT CARRIER.
APPLICATION FILED JAN. 30, 1904.

Witnesses
E. F. Stewart
C. H. Woodward

Osro W. Randall Inventor
by C. A. Snow & Co
Attorneys

No. 781,158.

Patented January 31, 1905.

UNITED STATES PATENT OFFICE.

OSRO W. RANDALL, OF MILLERGROVE, TEXAS.

VEHICLE-SHAFT CARRIER.

SPECIFICATION forming part of Letters Patent No. 781,158, dated January 31, 1905.

Application filed January 30, 1904. Serial No. 191,355.

*To all whom it may concern:*

Be it known that I, OSRO W. RANDALL, a citizen of the United States, residing at Millergrove, in the county of Hopkins and State of Texas, have invented a new and useful Vehicle-Shaft Carrier, of which the following is a specification.

This invention relates to attachments to harness for supporting the shafts or thills from the harness, and has for its object to simplify and improve the construction and produce a device of this character which may be readily applied to any form or style of harness without change of structure and which will support the thill or shaft without danger of displacement or accidental releasement of the same.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
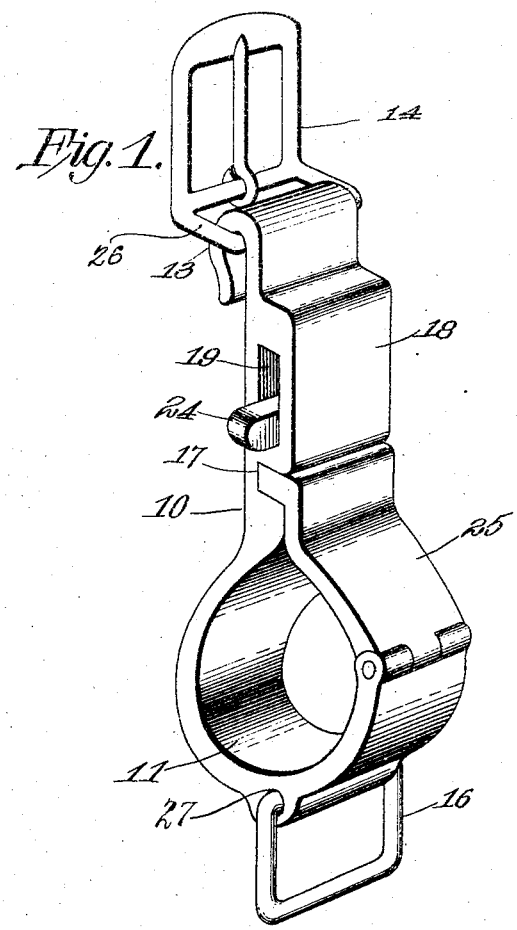
Figure 2:
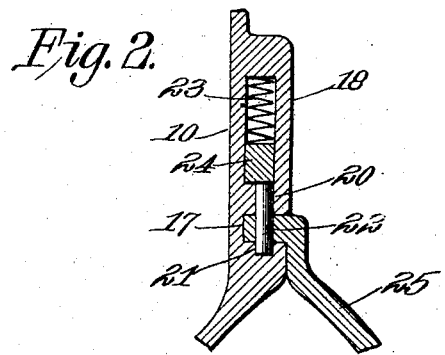

In the drawings thus employed, Figure 1 is a perspective view of the improved device. Fig. 2 is a sectional detail illustrating the construction of the locking-bolt.

The improved device comprises a shank member 10, having at one end a relatively large upturned hook 11 for supporting the shaft or thill and at the other end a relatively small hook 13 for supporting a buckle 14 for the billet of the back-band. The buckle 14 will preferably be provided with an offset loop 26 to receive the hook 13, and thus cause the billet to operate close to the back-band and also cause the shank 10 to hang in a perpendicular position and be sustained more steadily and all tendency to sway about when in use obviated.

Movably engaging the shaft-supporting hook 11 is a loop 16 for the girth-strap, preferably operating in an aperture 27 in the portion 11. The girth and back-band portions are not shown, as they form no part of the present invention and as their construction is so well known. The loop 16 and smaller hook 13 will fit any size of buckle or girth-strap, thus providing means for attachment to any of the various sizes or styles of harness manufactured.

Formed intermediately of the member 10 is a transverse recess 17, and between the recess and the smaller buckle-engaging hook 13 is a longitudinally-disposed bolt-casing 18, having a lateral longitudinally-disposed aperture 19 in one side. Between the recess 17 and the bolt-casing 18 is an aperture 20, and extending into the body of the member 10 from the opposite side of the recess is another aperture or socket 21. A bolt 22 is movably disposed in the casing 18 and extending through the apertures 20 21 and held yieldably in position by a spring 23. The bolt 22 is provided with an operating-button 24, projecting through the slot 19, and when in its downward position the bolt projects across the recess 17 and into the socket 21.

Hinged to the free end of the larger shaft-supporting hook 11 is a latch 25, with its free end apertured to receive the bolt 22 within the recess 17, by which means the latch is detachably supported.

By this arrangment of parts it is obvious that a very simply-constructed and easily-applied device is produced which may be quickly attached to any size or style of harness and by which means the thill or shaft may be securely supported and which will not be displaced by any strains to which it will be subjected when in use. It will be noted that the bolt is firmly supported from lateral movement by the solid material of the member 10 at each side of the recess 17 and that the relatively light strains exerted upon the latch 25 are firmly and efficiently resisted. The slot 19 coming at the rear side of the member 10, no danger exists of the release of the bolt by any object against which the device may come in contact. The operating-button 24 is thus in position to escape any object which the harness may engage while in use. This is an important feature of the invention and adds materially to the value and efficiency of the device. It will also be noted that all lateral and downward strains are borne entirely by the hook portion 11 and the comparatively light upward strains only borne by the latch 25, so that the tendency to breakage or displacement of the latch is reduced to a minimum.

The parts may be of any suitable metal and of any suitable size and may be japanned, plated, or otherwise protected or ornamented.

Having thus described the invention, what is claimed is—

A thill-tug comprising a shank terminating at its upper end in a downturned hook at the inner side thereof with its lower end terminating in an upturned thill-receiving hook located upon the outer side of the shank, the outer face of the shank being provided with a seat and a bolt-receiving casing located above the seat with an opening piercing the wall which separates the casing from the seat and said casing also having an upright slot, a latch hinged to the outer end of the thill-receiving hook and provided at its free end with a lateral extension to fit the seat and having an opening for alinement with the opening in the wall between the seat and the casing, a spring-actuated bolt working in the casing and the opening in the free end of the latch and the wall between the seat and the casing and provided with a finger-piece projected through the slot of the casing, a buckle having a laterally-offset loop at its lower end loosely engaged by the upper hook of the shank, and a girth-receiving link loosely hung from the thill-receiving hook.

In testimony that I claim the foregoing as my own I have hereto affixed my signature in the presence of two witnesses.

OSRO W. RANDALL.

Witnesses:
  CRAVEN WILSON,
  H. BLAKE.